United States Patent
Rullmann et al.

(10) Patent No.: US 6,694,591 B2
(45) Date of Patent: Feb. 24, 2004

(54) SYSTEMS AND METHODS FOR APPLYING RING SHAPED SEAL MEMBERS

(75) Inventors: Douglas Rullmann, Trevor, WI (US); Lester Banach, Burr Ridge, IL (US)

(73) Assignee: Acadia Polymers, Inc., Woodridge, IL (US)

( * ) Notice: Subject to any disclaimer, the term of this patent is extended or adjusted under 35 U.S.C. 154(b) by 0 days.

(21) Appl. No.: 09/994,239

(22) Filed: Nov. 26, 2001

(65) Prior Publication Data

US 2003/0097744 A1 May 29, 2003

(51) Int. Cl.⁷ .............................................. B23P 11/02
(52) U.S. Cl. .............................. 29/450; 29/446; 29/235
(58) Field of Search ...................... 29/450, 451, 522.1, 29/229, 235, 446, 270, 278, 280, 282

(56) References Cited

U.S. PATENT DOCUMENTS

| | | | | |
|---|---|---|---|---|
| 1,965,876 A | * | 7/1934 | Bettis | 29/450 |
| 2,382,359 A | * | 8/1945 | Weightman | 29/282 |
| 3,158,923 A | * | 12/1964 | Reisnsma | 29/898.11 |
| 3,553,817 A | * | 1/1971 | Lallak | 29/235 |
| 3,581,379 A | * | 6/1971 | Drobilits | 29/450 |
| 3,834,543 A | * | 9/1974 | Dreves | 210/232 |
| 4,291,451 A | * | 9/1981 | O'Neill et al. | 29/235 |
| 4,325,172 A | * | 4/1982 | Holdaway | 29/235 |
| 4,515,376 A | * | 5/1985 | Okamuro | 29/451 |
| 4,821,398 A | * | 4/1989 | Hillstead | 29/450 |
| 4,907,811 A | * | 3/1990 | Nash et al. | 277/551 |
| 5,054,821 A | * | 10/1991 | Hillstead | 285/321 |
| 5,218,750 A | * | 6/1993 | Hannula et al. | 29/451 |
| 5,392,505 A | * | 2/1995 | Harada | 29/450 |
| 5,570,497 A | * | 11/1996 | Luzzi | 29/450 |
| 5,956,830 A | * | 9/1999 | Imbus et al. | 29/235 |
| 6,397,446 B1 | * | 6/2002 | Whetstone | 29/235 |
| 6,507,985 B1 | * | 1/2003 | Loughlin et al. | 29/229 |

FOREIGN PATENT DOCUMENTS

| | | | | | |
|---|---|---|---|---|---|
| JP | 361209827 A | * | 9/1986 | | 29/235 |
| JP | 362009837 A | * | 1/1987 | | 29/235 |

* cited by examiner

Primary Examiner—Gregory Vidovich
Assistant Examiner—Essama Omgba
(74) Attorney, Agent, or Firm—Mayer Brown Rowe & Maw LLP

(57) ABSTRACT

Systems and methods are provided for the placement of ring shaped seal members on mechanical housings. In accordance with a preferred exemplary embodiment of the invention, a tapered insertion tool is placed over a mechanical housing on which a ring-shaped seal member is to be located. The ring-shaped seal member is then placed on the tapered insertion tool. A further insertion device is moved over the tapered insertion tool and an inner tubular portion pushes the ring-shaped seal member body over the tapered insertion tool. An outer tubular portion of the further insertion device advantageously prevents the ring-shaped seal member body from rolling during the insertion process.

9 Claims, 6 Drawing Sheets

SYSTEMS AND METHODS FOR APPLYING RING SHAPED SEAL MEMBERS

BACKGROUND OF THE INVENTION

1. Field of the Invention

The present invention is generally directed to the field of systems and methods for securing fluid sealing devices that prevent fluid leakage in mechanical systems. More specifically, the present invention is directed to improved systems and methods for installing ring-shaped seal members and specific embodiments of the invention provide the ability to maintain the orientation of seal members during insertion.

2. Description of the Related Art

A wide variety of ring-shaped seal members have been used in mechanical systems in order to prevent the leakage of fluids in these systems. They are typically utilized in the field of hydraulic drive systems in order to prevent fluid leakage in the mechanical systems driven by the hydraulics. There are currently a wide variety of seal members available today from simple O-ring single component seal members to scarf cut seals as well as more complex composite seals made from unitary bodies of material. More recently, composite ring-shaped seal structures have been introduced which have improved fluid leakage prevention characteristics over existing conventional seals. Unfortunately, one of the drawbacks of these new and improved sealing structures is that the existing conventional systems and methods for applying conventional seal structures in their desired locations are inadequate for the new and improved composite seal structures.

For example, a typical conventional system and method for applying conventional O-ring seals is found in the fabrication of fuel injector components. In these prior art systems and methods, conventional O-ring seals of varying diameters are applied to a fuel injector component body. In order to accomplish seating of the seal member in a desired location, a machine is utilized to pneumatically drive or force the O-rings to a desired level on a fuel injector assembly. During this process, a pneumatic drive would push a circular tube with slits cut in the side of the tube at the distal end in order to allow radial expansion of the distal portions of the tube as the tube extends over an application tube that has a somewhat conical portion to allow the O-ring seal member to gradually expand over the application tube.

FIG. 1 illustrates an example of a prior art sealing application system and method wherein an O-ring seal is applied on a mechanical housing. As shown in the illustration, a mechanical body on which a seal is to be located 12 includes ridges 14,16 within which the O-ring 17 is to be secured. In order to facilitate placement of the O-ring at the desired location on the mechanical body, a conical insertion device 18 is placed over the mechanical body 12 to which the seal is to be applied. During the installation process, an O-ring seal 17 is placed over the conical body 18 and a tube 19 having a plurality of vertical slits in the distal end of the tube is then inserted over the conical member on which the O-ring seal member is located. The slits in the application tool allow the distal end of the tool to engage side wall of the O-ring seal member as the device is pushed downward over the conical member. During the application process, because force is applied from a side wall and the conical body on which the O-ring rests, the O-ring tends to roll as the ring is pushed downward along the conical member. Those skilled in the art will appreciate that in these prior art application systems, an automated machine that was typically, pneumatically driven, would be utilized to place the seal on the conical body and force the application tool downward to secure the seal in a desired location.

In this process, the distal end of the application tube is in contact with the seal member as the seal is pushed down along the sides of the fuel injectors. A mechanical stop interacts with the O-ring seating tube and prevents displacement of the O-ring beyond a desired point. This mechanical stop ensures that the seal member is secured at its desired location on the fuel injector component. Typically, there is a metallic ribbed portion on the device on which the seal is located that would secure the seal.

In these prior art systems and methods for installing rubber O-ring seals, there was previously no concern for rolling of the O-ring member while the O-ring was driven into position down the tapered or conical shaft of the insertion device. This was due to the fact that the characteristics of an O-ring sealing member are such that orientation of the seal is not particularly important in order to achieve the desired sealing effect.

Recently, specifically in the field of automatic transmission systems, new zero leak seals have been designed which are composite components that are comprised of layers of PTFE and FKM elastomer. These new zero leak seals are comprised of an outer PTFE ring-shaped body and a central inner ring secured to this outer PTFE body that is typically comprised of flexible material, such as, for example, FKM elastomer. In preferred embodiments of these sealing members the elastomer is configured to have various ridges on an inner portion of the zero leak seal member which further aid in the sealing characteristics of the product. In light of the specific characteristics of this product, it is imperative that the orientation of the seal member be maintained such that the inner portion of the seal is the flexible elastomeric portion and the outer portion is the PTFE body on which the elastomeric is secured.

If the zero leak seal member is allowed to roll during the application process to switch the orientation of the inner and outer portions, the seal will not work as intended and will fail. Accordingly, it was necessary to develop new manufacturing techniques for securing these new and improved zero leak sealed member bodies and mechanical assemblies.

The inventors of the present systems and methods for applying new zero leak seals attempted to utilize various versions of the prior art techniques for installing the new and improved zero leak seals without success. Previous attempts at solving this problem included providing various beveling on the distal ends of the insertion tube with the slits cut in the distal end in order to attempt to prevent rolling of the zero leak seal during the application process. As noted rolling of these new zero leak seals effectively destroys their ability to provide a sound fluid seal. Others have attempted to provide improved techniques which would result in the desired application of a zero leak seal member but have not succeeded in providing an acceptable solution.

Thus, there remains a need in the field for new and improved systems and methods for installing ring-shaped seal member bodies. Accordingly, one object and advantage of the present invention is to provide improved systems and methods for installing ring-shaped seal member bodies which can be utilized with zero leak seal members. Another object and advantage of the present invention is to provide improved systems and methods for installing ring-shaped seal member bodies which aid in preventing rolling of the ring-shaped seal member body. Other objects and advantages of the present invention will be apparent in light of the following Summary and Detailed Description of the Presently Preferred Embodiments.

SUMMARY OF THE INVENTION

In accordance with the present invention, new and improved systems and methods for installing ring-shaped seal member bodies are provided. In accordance with a first preferred exemplary embodiment of the present invention, the systems and methods for installing a ring-shaped seal member body on a mechanical housing include steps of placing a tapered insertion tool over the mechanical housing on which the ring-shaped seal member body is to be located and thereafter placing a ring-shaped seal member body on the tapered member.

In accordance with a preferred exemplary embodiment of the present invention, when the ring-shaped seal member body is a zero leak seal, the zero leak seal member body is placed on the tapered member with the rubber portion oriented toward the center of the tapered member. Orientation of the seal member in this manner prior to securing the seal ensures that the appropriate orientation for the ring-shaped seal member body is achieved on the mechanical body on which the seal member is to be placed.

After the seal member has been placed on the tapered insertion body, an insertion device is pushed downward over the tapered member. This insertion device is comprised of two separate portions at a distal end of the insertion tool. In accordance with the preferred exemplary embodiment, the inner member is the first to engage the ring-shaped seal member body as the insertion tool is lowered over the tapered body. The inner member is comprised of an elongated tube-shaped member with a plurality of slits cut in the distal portion to allow the distal end of the tube-shaped member body to readily expand over the sides of the tapered body during the insertion process. As the insertion tube slides over the tapered member, the tapered body engages the distal end of the insertion tube and gradually expands the outer diameter of the insertion tube. This is enabled by the vertical or lengthwise slits in the distal of the insertion tube. As the insertion tube gradually extends downward on the conical body, the distal end of the insertion tube engages the side of the zero leak seal member body. In accordance with the preferred exemplary embodiment, the distal end of the tube-shaped body which makes contact with the ring-shaped seal member has a beveled face such that an inner portion of the tube member gradually slopes away from the distal end. This beveled face is desirably placed at an angle that depends on the geometry of the seal members. The initial contact in the preferred embodiment occurs typically at the tip of the beveled end of the base and the side wall of the zero leak seal member body closest to a top of the tapered member. As the insertion device is further inserted downward over the conical member, the ring-shaped seal member body expands with increasing diameter of the tapered member. The contact between the side of the seal and beveled edge of the insertion tool aids in the prevention of rolling of the ring-shaped seal member body.

A further tubular member or second portion of the insertion device having a diameter greater than the tapered insertion device includes an inner wall in the preferred exemplary embodiment that has a substantial vertical wall at the distal end. This additional tubular body is located to ensure that the ring shaped seal member body does not roll as it expands along the tapered side wall of the tapered member. It is also preferably dimensioned such that the inner diameter of this member is preferably the diameter of the tapered member at its largest point plus $2/3$ of the unstretched part thickness of the nominal unstretched seal thickness of the ring-shaped seal member body in its unstretched position. As detailed below, this tubular body has an inner wall that is slightly below the wall of the seal opposite the beveled wall of the insertion tube to prevent rolling of the seal during insertion. This physical relationship is preferred in order to ensure that this member does not pull back on the ring once it has set into its desired location.

The physical spatial relationship between the inner and outer tubular members or portions of the insertion tool is preferably maintained during the insertion process to be constant. A mechanical stop ensures that the inner tubular member extends only to the edge of the desired location of the ring during the insertion process. This edge is also the end of the tapered body and this physical relationship allows the ring-shaped seal member to snap into place at its desired location. In accordance with the preferred exemplary embodiment, multiple tapered or conical members are sequentially placed on a mechanical housing to which a plurality of seals are to be located and each of the separate tapered members is configured to end at each desired seal placement location. Accordingly, in accordance with the preferred exemplary embodiments of the present invention, a ring-shaped seal member body may be readily inserted such that the orientation of the inner and outer portions of the ring-shaped seal member body are maintained.

In accordance with the preferred exemplary embodiment, both the tapered member and the insertion tube members are comprised of stainless steel. The inner insertion tube member has slits cut into its body in order to allow the distal end to expand around the increasing diameter of the tapered member. Those skilled in the art will appreciate that other materials may be utilized for formation of the various devices utilized in the systems and methods of the present invention. In particular, plastic may be substituted for the preferred steel construction. Steel is preferred, however, because of the slip characteristics of this material which more readily allows sliding of the various components. Those skilled in the art will recognize that plastic or perhaps some other carbon or composite material may be utilized as well for formation of the tapered member as well as the insertion tool portions.

The insertion tool may actually be comprised of two distinct members or the two separate portions may be formed into a single device.

DETAILED DESCRIPTION OF THE PRESENTLY PREFERRED EMBODIMENTS

Figure 1:
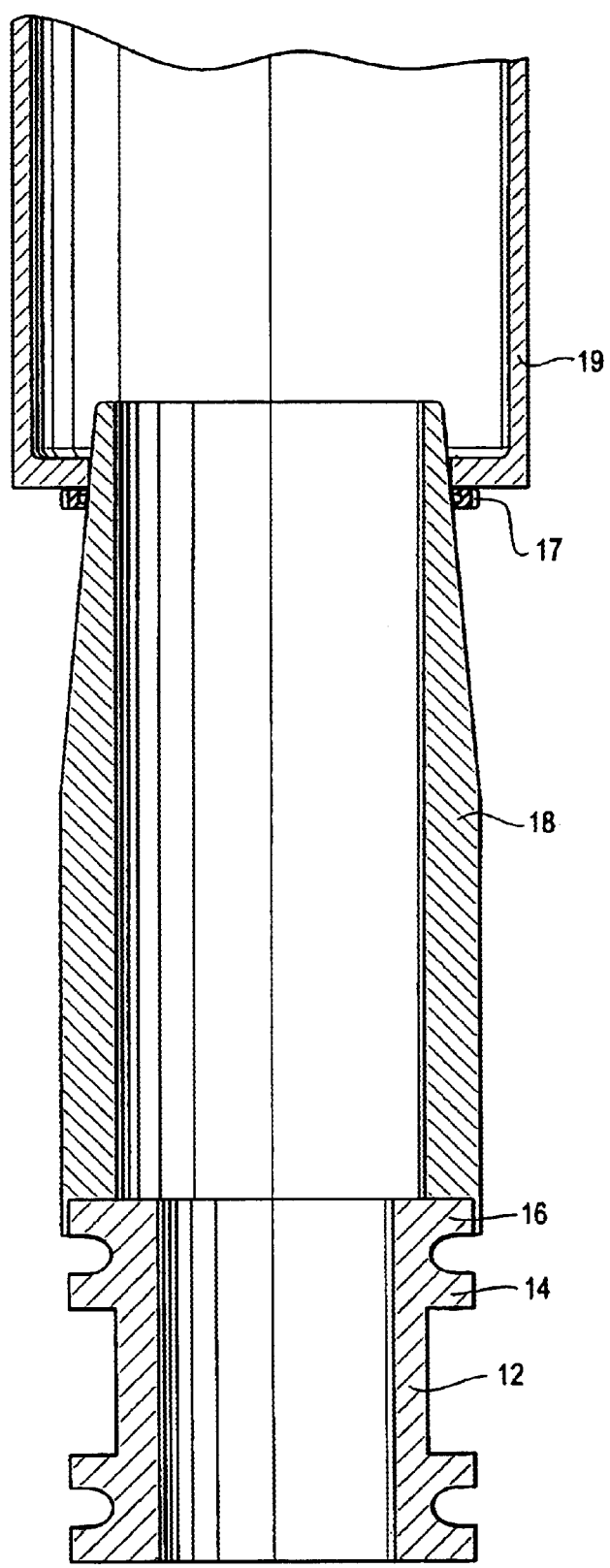
FIG. 1 illustrates prior art technology for inserting conventional O-ring seal members.
Figure 2:
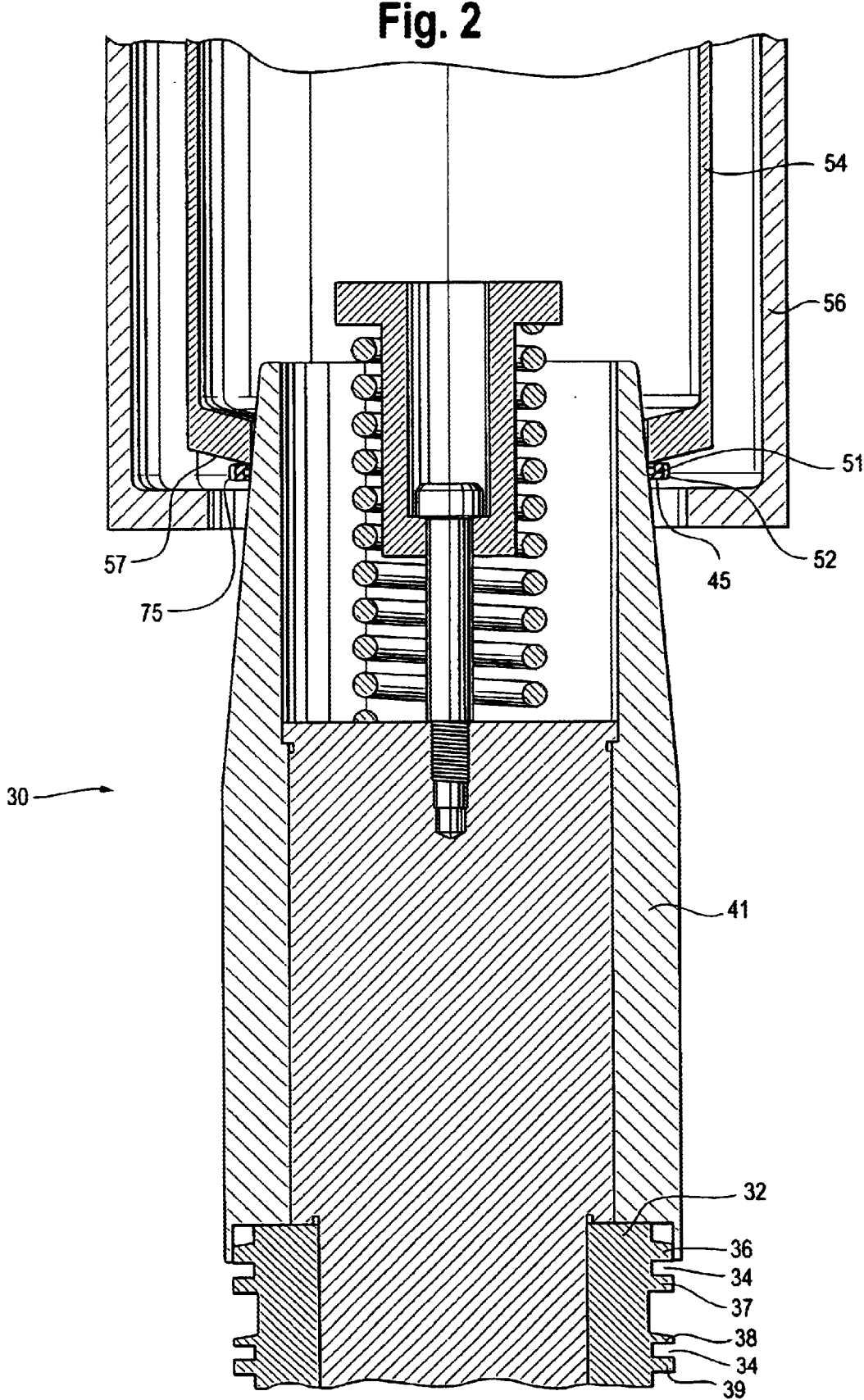
FIG. 2 illustrates a first exemplary embodiment of the present invention.

FIG. 2 illustrates a first exemplary embodiment of the present invention which is shown generally at 30. As shown in FIG. 2, a mechanical body 32 has a plurality of grooved areas 34 that are defined by ridges 36,37 and 38,39 within which seal members are to be placed. In order to facilitate placement of the seal member in a desired location, a tapered insertion tool 41 is secured above the mechanical body 32 on which one or more seals is to be located.

During the manufacturing and insertion process, a seal member 45 is placed on the tapered member. The seal member shown in the preferred exemplary embodiment is a zero leak seal member comprised of an inner portion 51 and an outer portion 52. The inner portion is preferably comprised of rubber or elastomer and the outer portion is preferably comprised of PTFE. The zero leak seal of the preferred exemplary embodiment has its rubber portion shaped to provide upper and lower inner rib portions. Those skilled in the art will appreciate that other configurations are possible as well.

After the seal has been located on the tapered body with the desired orientation, an insertion tool is placed over the tapered tubular insertion tool. This insertion tool is comprised of an inner tubular portion 54 and outer tubular portion 56 that are utilized to move the ring-shaped seal member during the insertion process to a desired location on the mechanical body 32. As the ring-shaped seal member is inserted over the conical body, the distal end of the inner tubular member 54 initially, preferably engages the tapered member and thereafter engages the base side wall of the seal member closest to the distal end of the insertion tube 54. As noted above, this insertion tube is a tubular body comprised of a plurality of vertical slits in the distal end which enable the distal end to gradually expand over the tapered body 41 as the distal end is extended downward over the tapered body, thereby allowing a downward force to be applied on the ring shaped seal body.

Figure 3:
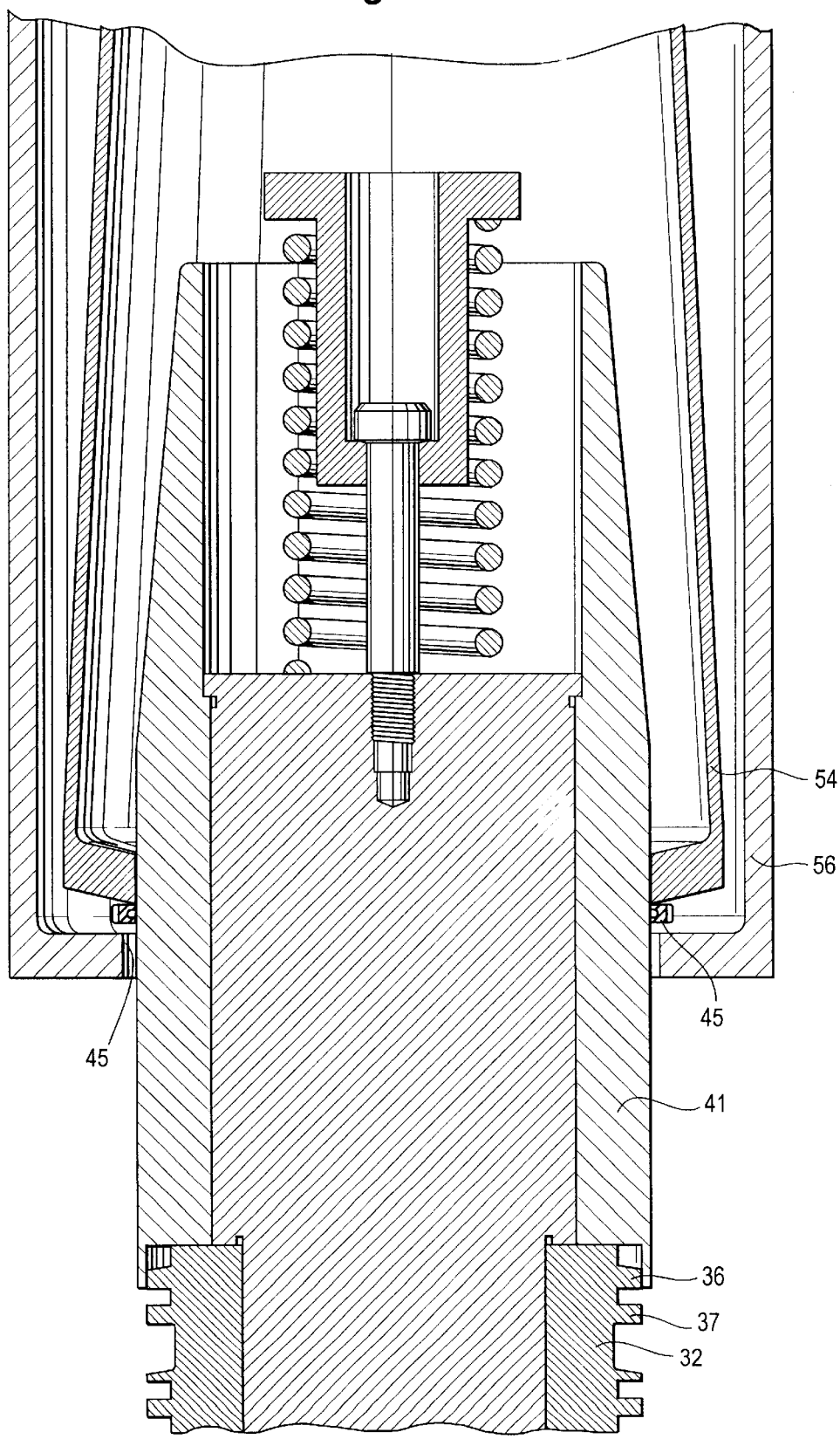
FIG. 3 illustrates a first exemplary embodiment of the present invention.

The inner tubular portion 54 of the insertion tool of the preferred exemplary embodiment is preferably comprised of alloy steel. As noted, the tubular portion preferably has vertical slits at the distal end which have not been shown in this illustration. In the preferred exemplary embodiment, when the inner tubular member 54 is comprised of steel, the slits have a thickness and number that is developed depending on part geometry. The slits ensure the distal end readily expands over the tapered body 41. The inner tubular portion of the insertion tool preferably has a beveled portion 57 at its distal end. The beveled portion 57 is first to engage the adjacent side wall of the ring-shaped seal member body 45 during the insertion process. FIG. 2 illustrates the initial point of contact in accordance with the preferred exemplary embodiment. The rest angle of bevel on the distal end of the insertion tube portion 54 is as noted dependent on part geometry. The outer tubular portion 56 in accordance with the preferred exemplary embodiment does not have a beveled edge at its distal end. Rather, a vertical inner wall is preferably provided on the distal end of this body 56. As shown in FIG. 2, the preferred inner diameter of the second tubular member of the insertion tool 56 is arranged to have an inner diameter spacing that is approximately the diameter of the tapered body 41 at its largest point plus ⅔ of the nominal unstretched seal thickness. This relationship of the outer diameter prevents pullback on the ring when the insertion device 56 is removed while also preventing the part or ring seal from rolling. The second tubular member is preferably secured with set screws to allow its relative location to be adjusted to prevent rolling during insertion. The upper portion of this member is slightly below the bottom of the seal member. FIG. 3 illustrates further insertion of the ring-shaped sealing member 45. As shown in FIG. 3, the beveled edge 57 of the inner insertion tool portion 54 is applying a downward force on the ring-shaped body 45. At this point in the insertion process as the ring-shaped body is moving along the outer side wall of the tapered insertion tool, the outer portion of the insertion member 56 is located adjacent to the lowermost wall of the ring member. The relationship described above allows the outer tubular body 56 to contact the ring-shaped seal member body in order to prevent rolling of the seal member 45. As noted above, rolling would cause inadvertent placement of the seal and prevent it from operating properly.

Figure 4:
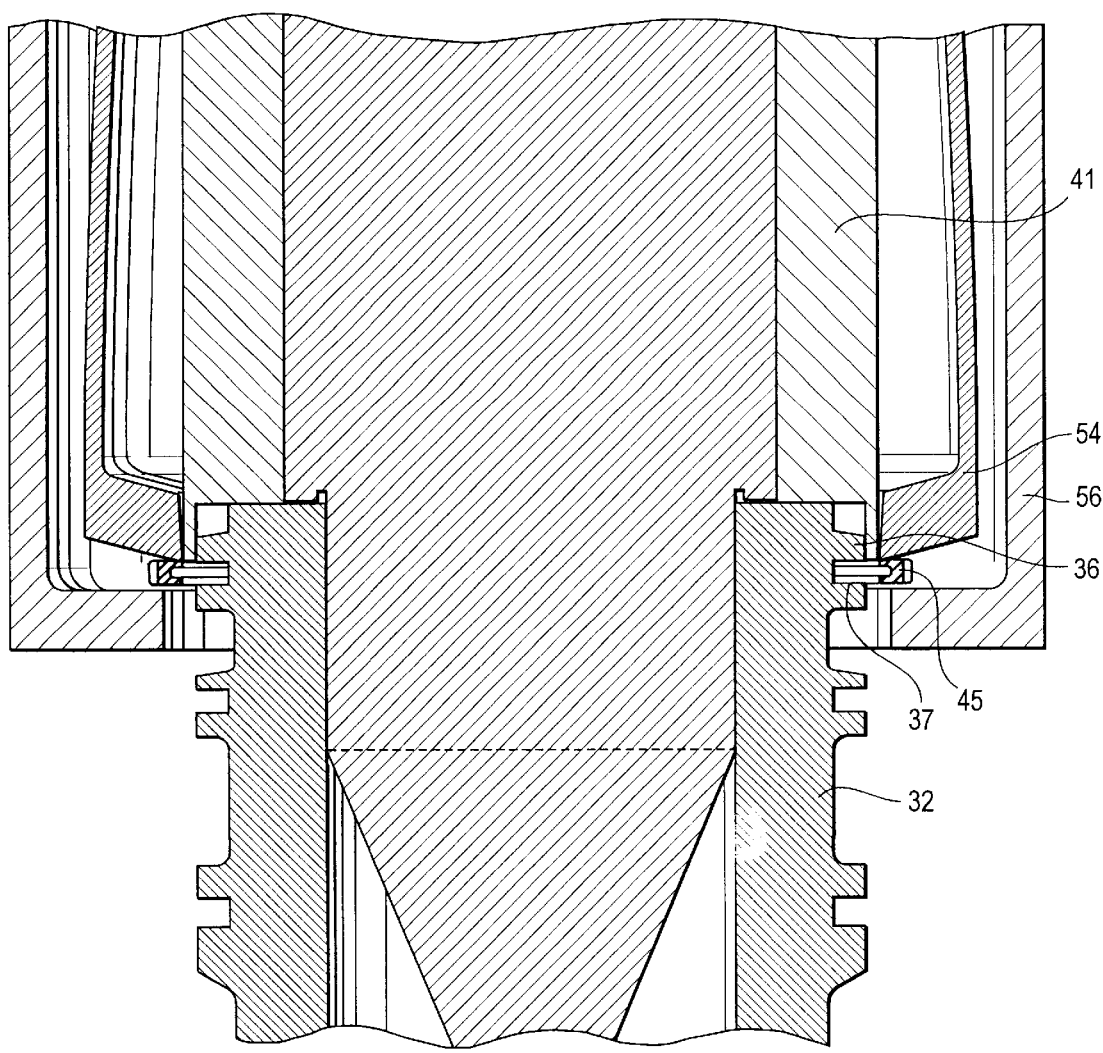
FIG. 4 illustrates a first exemplary embodiment of the present invention.

FIG. 4 illustrates further progress of the seal member as it is inserted into the desired portion of the mechanical body 32. The tapered insertion tool 41 has a lowermost outer wall configured to end at the lowermost edge of the upper rib 36 that defines the desired location 34 of seal member 45. When the insertion tool 54 has pushed the seal member 45 to this location, the resilient characteristics of the inner rubber portion of the zero leak seal member of the preferred embodiment results in contraction of the seal member body 45 to secure the seal member in its desired location 34.

Figure 5:
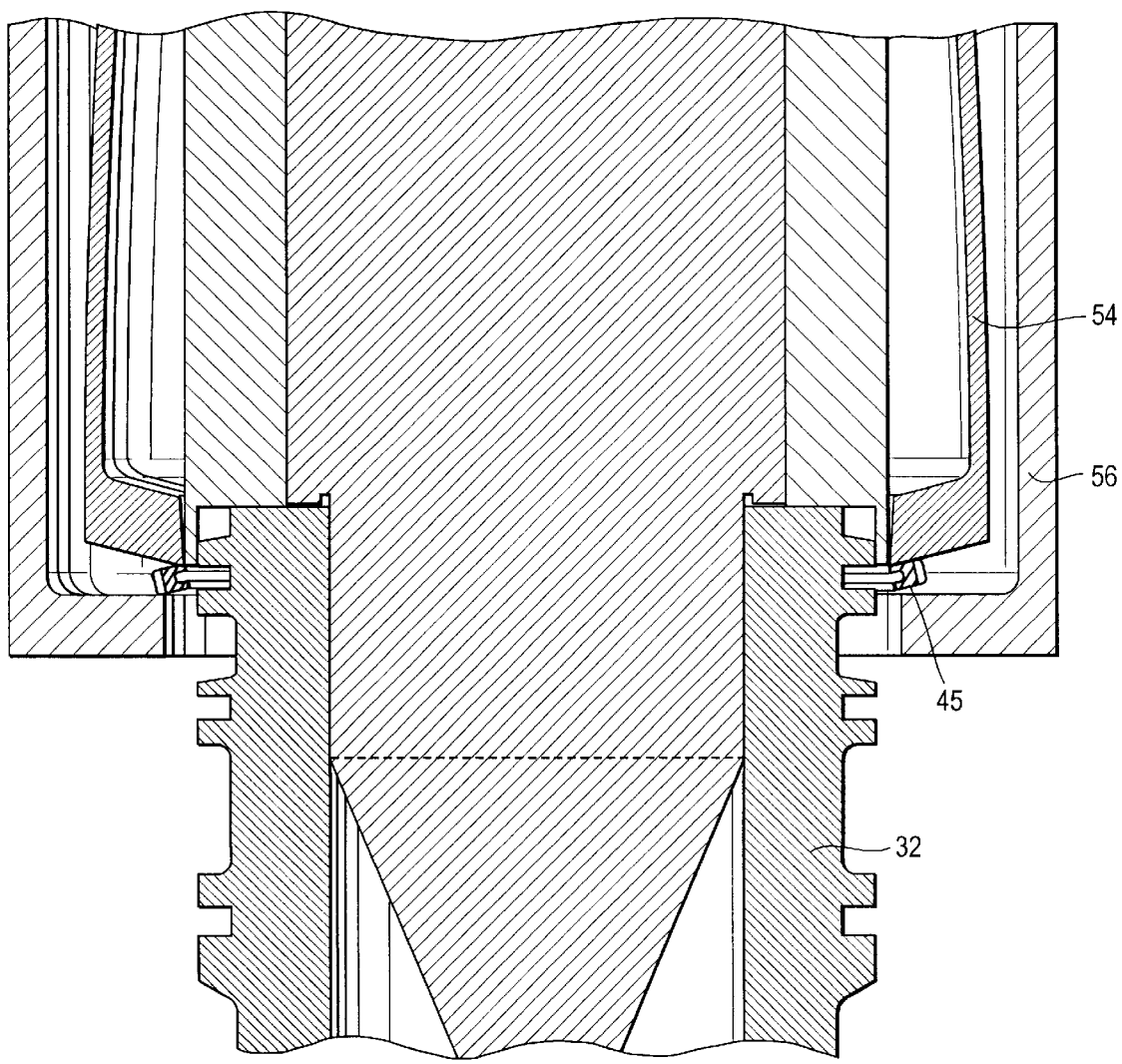
FIG. 5 illustrates a first exemplary embodiment of the present invention.

FIG. 5 illustrates how the outer insertion tool portion 56 prevents rolling of the seal at the point of insertion, thereby ensuring the appropriate orientation of the ring-shaped seal member body 45. As shown in FIG. 5, an inner side wall of the outer insertion tool engages the lowermost end of the ring shaped seal member body as it attempts to roll, thereby preventing rolling and allowing the resilient forces of the relaxing inner portion of the seal member body to snap the ring member into place. After the ring member 45 has been inserted into its desired location on the mechanical body 32, the insertion tools are withdrawn.

Figure 6:
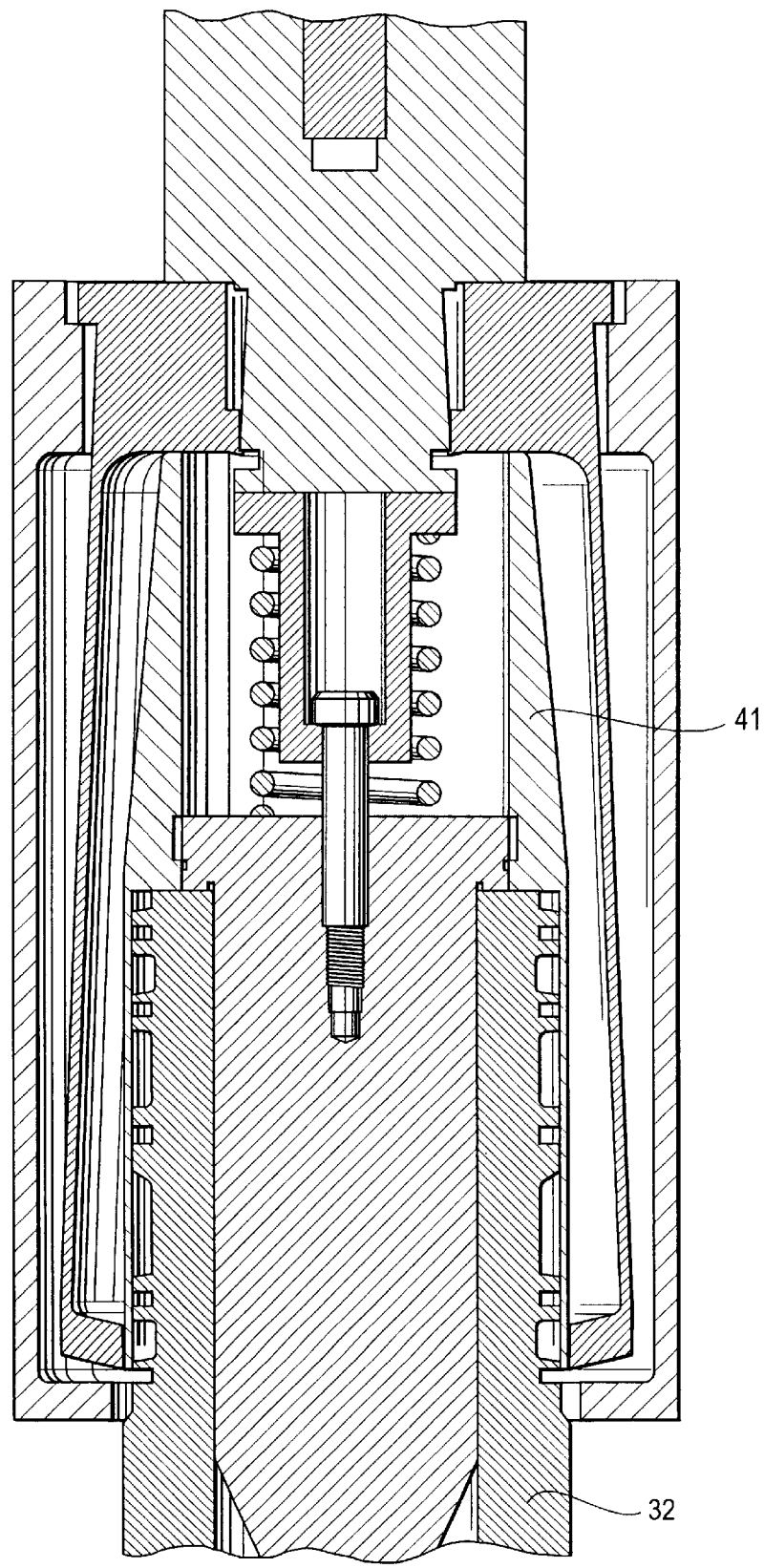
FIG. 6 illustrates a first exemplary embodiment of the present invention.

FIG. 6 illustrates how tapered members of various sizes and lengths may be utilized to secure the desired placement of various seal members into various locations along a single mechanical body. The tapered portion has a relationship between its lower, inner wall 65 which rests on the housing 32 to which the seal is to be secured. The outer side wall is configured to end at the desired placement location for the seal member. Those skilled in the art will appreciate that although the tapered member and insertion tools 54,56 are preferably comprised of steel, it is contemplated that other materials will also be suitable for forming these devices. Other, alternative, materials include such things as, for example, plastics and carbon composite materials and the like. Fiberglass construction would also probably work.

In accordance with the preferred exemplary embodiment of the invention, the inner and outer portions of the insertion tool are actually comprised of separate tubular bodies 54 and 56 which may be secured to one another. However, those skilled in the art will appreciate that a single unitary body having an inner portion 54 and an outer portion 56 may also be provided.

It should be recognized that various modifications and adjustments to the specific embodiments disclosed herein may be provided while nonetheless utilizing the spirit and scope of the present invention. Accordingly, the invention should only be limited as defined in the appended claims.

We claim:

1. A method of installing a ring shaped seal member comprising the steps of:

placing a tapered member over a body on which a seal is to be applied;

placing a ring shaped seal over the tapered member;

moving the tapered member into an expandable hollow tubular member having a distal end which contacts a side of the seal;

providing a further tubular portion over the expandable hollow tubular member, the further tubular portion having an inner diameter portion that is located on a side of the seal opposite the distal end of the expandable hollow tubular member; and pushing the seal member over the tapered member to a desired location;

wherein both the expandable hollow tubular member and the further tubular portion are in contact with the ring shaped seal as the seal is pushed over the tapered member.

2. The method of installing a ring shaped seal member of claim 1, wherein the seal is a composite member form of PTFE and elastomer.

3. The method of installing a ring shaped seal member of claim 1, wherein the hollow tubular member is comprised of steel.

4. The method of installing a ring shaped seal member of claim 1, wherein the hollow tubular member is comprised of plastic.

5. The method of installing a ring shaped seal member of claim 1, wherein the further tubular portion is comprised of steel.

6. The method of installing a ring shaped seal member of claim 1, wherein the further tubular portion is comprised of plastic.

7. The method of installing a ring shaped seal member of claim 1, wherein the hollow tubular member and the further tubular portion is a unitary body comprised of steel.

8. The method of installing a ring shaped seal member of claim 1, wherein the hollow tubular member and the further tubular portion is a unitary body comprised of plastic.

9. The method of claim 1 wherein the expandable hollow tubular member has a beveled distal end.

* * * * *